United States Patent [19]
Oehlke

[11] Patent Number: 4,735,534
[45] Date of Patent: Apr. 5, 1988

[54] FASTENER ASSEMBLY FOR CYLINDRICAL OPENING

[75] Inventor: Donald N. Oehlke, Troy, Mich.

[73] Assignee: Eaton Corporation, Cleveland, Ohio

[21] Appl. No.: 2,539

[22] Filed: Jan. 12, 1987

[51] Int. Cl.⁴ ............................................. F16B 37/04
[52] U.S. Cl. ......................................... 411/177; 16/2;
    174/153 G; 248/56; 403/155; 411/522
[58] Field of Search .................................. 411/522–524,
    411/520, 254, 176, 177, 182; 174/153 G;
    248/56; 403/155, 201, 194; 16/2

[56] References Cited

U.S. PATENT DOCUMENTS

| | | | |
|---|---|---|---|
| 13,529 | 2/1913 | Thordarson | 174/153 G |
| 1,056,392 | 3/1913 | Barr et al. | 16/2 X |
| 1,750,257 | 3/1930 | Bonnell | 16/2 X |
| 2,278,708 | 4/1942 | Miller | 411/522 X |
| 3,178,987 | 4/1965 | Reese et al. | 411/523 |
| 3,297,916 | 1/1967 | Wright | 411/522 X |
| 3,340,760 | 9/1967 | Wormser | 411/520 |
| 4,177,972 | 12/1979 | Legris | 411/522 X |
| 4,587,705 | 5/1986 | Ruck et al. | 411/520 X |
| 4,637,741 | 1/1987 | Gillet | 403/155 X |

FOREIGN PATENT DOCUMENTS

| | | | |
|---|---|---|---|
| 1625262 | 2/1970 | Fed. Rep. of Germany | 411/177 |
| 1577506 | 6/1969 | France | 16/2 |

*Primary Examiner*—Lloyd A. Gall
*Attorney, Agent, or Firm*—D.A. Rowe; A.E. Chrow

[57] ABSTRACT

A fastening assembly is provided for supporting an elongate member through a substantially circular opening through a frame. The assembly comprises a support member (60) having a flange portion (2) larger than the frame opening with a body portion (4) extending transversely therefrom. A bore (6) for receiving the elongate member therethrough extends through flange portion (2) and body portion (4). Body portion (4) includes a transverse groove (8) and at least one axially extending groove (10) in its outer surface that are respectively exposed on the opposite side of the frame opening into which support member (60) is received. The assembly includes a retainer clip (70) operable to engage groove (8) and secure support member (60) axially within the frame opening and at least one resilient arm operable to engage axial groove (10) and prevent clip (70) from rotating with the frame including means for preventing rotation of retainer clip (70).

14 Claims, 2 Drawing Sheets

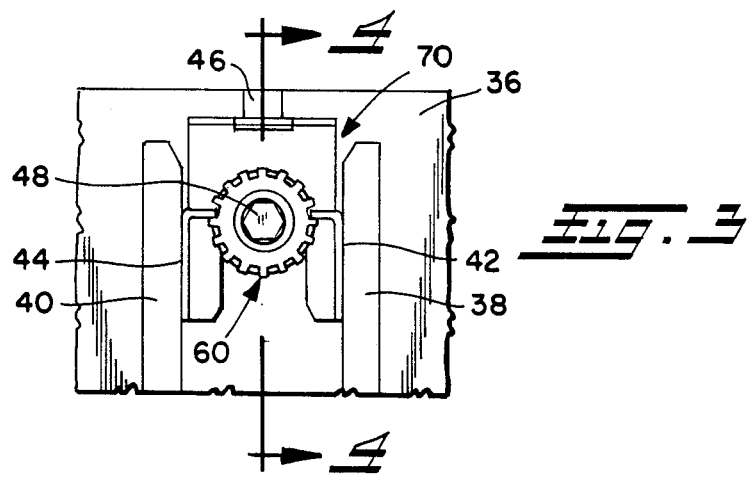
Fig. 3
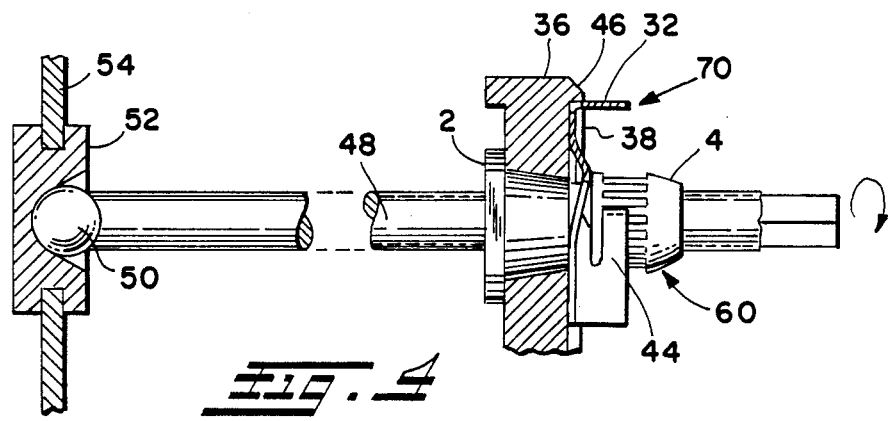
Fig. 4
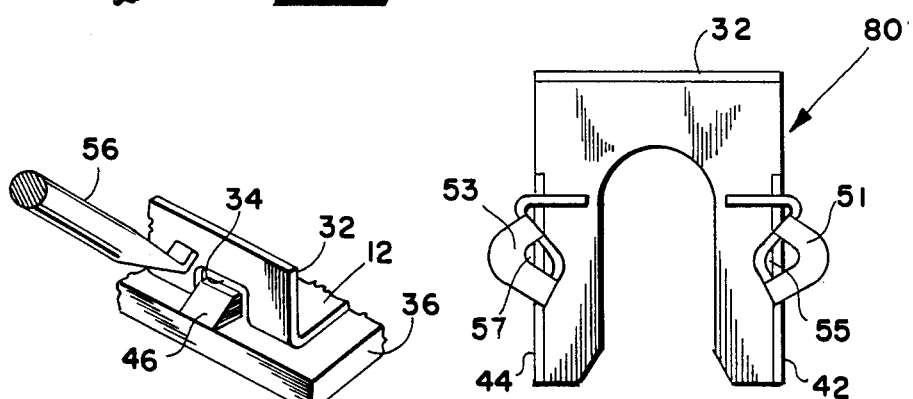
Fig. 5
Fig. 6

FASTENER ASSEMBLY FOR CYLINDRICAL OPENING

INTRODUCTION

This invention relates generally to a fastener assembly for supporting an elongate member such as a shaft or an externally threaded member such as a screw in a substantially cylindrical opening through a frame and more particularly to a two-part fastener assembly that is particularly advantageous for use in supporting a vehicular headlight position adjusting screw in a substantially cylindrical opening through a stationary frame provided by the vehicle.

BACKGROUND OF THE INVENTION

Although it is often more convenient to provide a square or other type of non-cylindrical opening through a frame for securing a support member against rotation within the opening, it is sometimes desired that the opening through the frame be cylindrical for one reason or another which creates special problems in insuring that the support member is prevented from rotating within the cylindrical opening when a shaft or an externally threaded member such as a screw is rotated within a bore through the support member particularly where the support member is a nut member and the bore therethrough is provided with threads that threadingly engage the threads of the screw.

One area of recent interest has been the desire to use cylindrical openings through a vehicular support frame for mounting a threaded nut through which an adjustment screw can be rotated through the grill for example to change position of the vehicle's headlight under the criterion that the mounting be done by a fastener assembly that can be readily attached to and removed from one side of the frame.

The present invention provides a removeable fastener assembly that is particularly advantageous for supporting a rotatable member such as a vehicular headlight position adjustment screw in a cylindrical opening through a support frame of the vehicle that can be easily mounted to or removed from one side of the frame.

SUMMARY OF THE INVENTION

Accordingly, it is an object of this invention to provide a removable fastener assembly for supporting an elongate member such as a shaft or an externally threaded member such as a screw within a substantially cylindrical opening through a frame.

It is another object of this invention for providing a fastener assembly for supporting an elongate member such as a shaft or an externally threaded member such as a screw within a substantially cylindrical opening through a frame that can be readily attached to and removed from one side of the frame.

BRIEF DESCRIPTION OF THE DRAWINGS

FIG. 3 shows a partial side elevation view support member 60 of FIGS. 1A and 1B and retainer clip 70 of FIGS. 2A and 2B supporting an externally threaded member 48 in an opening through a frame 36;

FIG. 4 shows a partial cross-sectional view taken through the side elevation view of FIG. 3;

FIG. 5 shows a partial perspective view of using a pry bar to remove retainer clip 70 from frame 36 of FIGS. 3 and 4; and;

FIG. 6 shows a front view of another embodiment of a retainer clip for use with the fastener assembly of the invention.

BRIEF DESCRIPTION OF SOME PREFERRED EMBODIMENTS

Figure 1A:
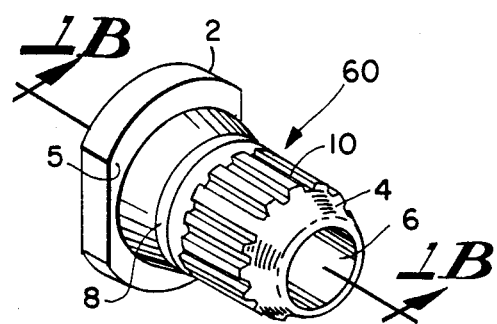
FIG. 1A shows a perspective view of a preferred embodiment of a support member 60 of the fastener assembly of the invention.
Figure 1B:
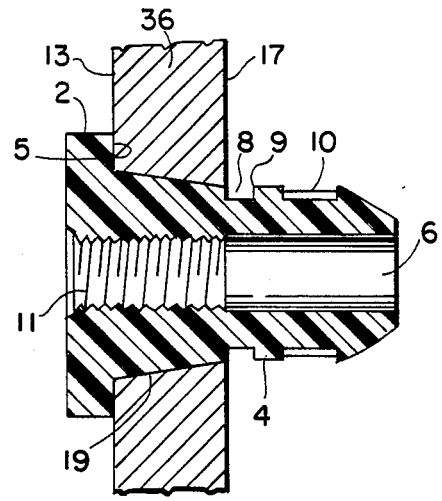
FIG. 1B shows a side elevation central cross-sectional view through support member 60 of FIG. 1A inserted through a substantially circular opening through a support frame.
Figure 2A:
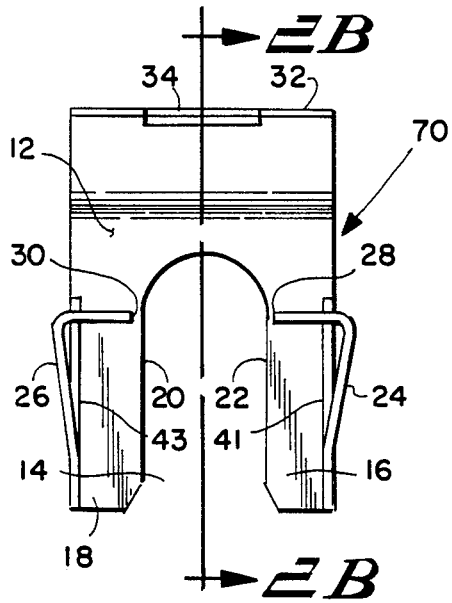
FIG. 2A shows a front view of a preferred embodiment of a retainer clip 70 used to secure support member 60 against axial and rotational movement within a substantially circular opening through a frame.
Figure 2B:
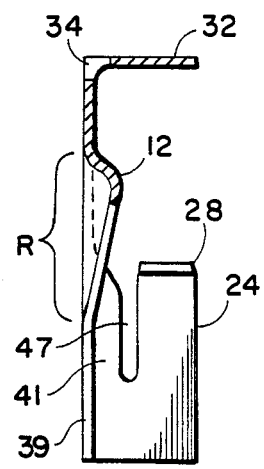
FIG. 2B shows a central cross-sectional view through retainer clip 70 of FIG. 2A.

A preferred embodiment of the fastener assembly of the invention comprises the combination of support member 60 of FIGS. 1A and 1B and retainer clip 70 of FIGS. 2A and 2B.

Support member 60 shown in FIG. 1 has a flange portion 2 from which transversely extends an elongate body portion 4. Body portion 4 preferably has an axially extending substantially cylindrical configuration whose outer diameter is adapted to enable it to be inserted through the substantially circular opening in the frame to which the support member 60 is to be both axially and rotationably secured. Flange portion 2 is larger than the opening through the frame to which the support member is to be mounted and has an annular face 5 facing toward body portion 4 that is adapted to engage the side of the frame opening into which body portion 4 is inserted.

As shown in FIG. 1A, body portion 4 has a transverse annular groove 8 in its outer surface spaced axially from face 5 of flange 2 and a plurality of axially extending grooves 10 in its outer surface that are preferably spaced circumferentially equidistant from each other about the outer surface of body portion 4.

An open ended bore 6 extends through flange portion 2 and body portion 4 that is the bore for receiving an elongate member such as a threaded screw.

Central longitudinal cross-section of support member 60 is shown in FIG. 1B with body portion 4 inserted through a substantially cylindrical opening 19 extending through frame 36 from side 13 to an opposite side 17. Frame 36 is further hereinafter described with respect to FIGS. 3, 4 and 5. In FIG. 1B, transverse groove 8 is spaced axially from flange portion 2 along body portion 4 such that groove 8 is exposed adjacent opposite side 17 of frame 36 when body portion 4 is inserted through opening 19 until face 5 of flange 2 abuts against side 13 of frame 36. Groove 8 has an annular edge 9 facing towards side 17 of frame 36. Although body portion 4 preferably has a tapered outer surface between face 5 of flange 2 that matches a corresponding taper in the wall of frame 36 surrounding opening 19, the term "substantially cylindrical" used herein relative thereto includes such tapers where desired.

Transverse groove 8 is operative to register with edges 20 and 22 respectively of legs 18 and 16 of 70 of FIGS. 2A and 2B for securing support member 60 against axial movement within opening 19. The open-ended bore 6 through support member 60 may be smooth for its entire length where it is not acting as a nut member. In FIG. 1B, support member 60 is acting as a nut member and therefor includes internal threads 11 for at least a portion of its length.

Although body portion 4 preferably has a substantially cylindrical configuration (that may include an axially extending tapered outer surface between flange 2 and transverse groove 8), it may have any suitable configuration provided it can be received through the frame opening and includes annular transverse groove 8 and at least one axially extending groove 10 and perform in the manner herein described.

Although support member 60 may be made from any suitable material, it is preferably made from a plastic material such as a suitable melt-processible nylon that can be molded to include transverse groove 8, axial groove(s) 10, bore 6, and threads 11, if any, without requiring machining.

Support member 60 is secured against axial and rotational movement in opening 19 by retainer clip 70 hereinafter described with respect to FIGS. 2A and 2B. Retainer clip 70 has a base portion 12 having an open ended slot 14 between spaced-apart legs 16 and 18 respectively having opposed edges 22 and 20 which face each other across slot 14 and are operable to engage transverse groove 8 of support member 60 and secure member 60 against axial movement within opening 19 when body portion 4 of support member 60 extends through slot 14 and clip 70 is then moved downwardly in a direction transverse to the longitudinal axis of body portion 4 while back side 39 of base portion 12 is adjacent to opposite side 17 of frame 36. As shown in FIG. 2B, base portion 12 is preferably provided with means such as an embossed ramp or wedge or other configuration at least in the upper region of legs 16 and 18 adapted to engage edge 9 of groove 8 and urge the support member towards the viewer's right in FIG. 1B sufficiently to secure member 60 axially within opening 19 when clip 70 is pressed downwardly onto groove 8. Alternatively, the relative thickness of base portion 12 and the axial width of groove 8 may be such as to preclude the need for such warped portion.

Retainer clip 70 is preferably provided with a pair of resilient spaced-apart arms 24 and 26 that extend away from base portion 12 and have respective free-ends 28 and 30 of which free-end 28 is operable to engage one of the axially extending slots 10 of body portion 4 and of which the other free-end 30 is operable to engage another of axially extending slots 10 of body portion 4 to secure support member 60 against rotation arising as a result of rotating a shaft or a smooth portion of a threaded member within bore 6 where member 60 is acting as a support member or arising as a result of threaded engagement between the threaded member where bore 6 is provided with threads and member 60 is acting as a nut member.

Although resilient arms 24 and 26 preferably extend from legs 16 and 18 of member 70 respectively in a direction away from the side of base portion 12 facing away from the side of the frame opening from which body portion 4 emerges and thence upwardly and thence angularly outwardly from opposite sides of base portion 12 and thence inwardly towards slot 14 to respective free-ends 30 and 28 that face each other across slot 14 as shown in FIG. 2A, they may of course extend angularly away from base portion 12 in any manner that results in spaced-apart free-ends 28 and 30 that face each other across slot 14 and are operable to respectively engage different axially extending grooves 10 of support member 60 in a manner preventing member 60 from rotating. Preferably, where body portion 4 has a substantially cylindrical configuration having a plurality of axially extending grooves 10 circumferentially spaced equidistant from each other about its outer surface, free ends 28 and 30 are operable to engage respective grooves 10 that are diametrically opposed to each other.

Clip 70 is preferably provided with flanges 41 and 43 respectively intermediate base portion 12 and arms 24 and 26 with intermediate elongate slots such as 47 shown in FIG. 2B adapted to provide an opening that can be used to insert a pry bar such as a screw driver to pry arms 24 and 26 from engagement with body member 4. Retainer clip 70 preferably further includes an opening 34 that is accessible and is effective for coacting with a pry bar such as a screw driver or other suitable device such as shown in FIG. 5 enabling retainer clip 70 to be pried away from engagement with support member 60 enabling removal of member 60 from opening 19 of frame 36.

As shown in FIGS. 2A and 2B, retainer clip 70 preferably includes a lip 32 that extends away from base portion 12 in a direction away from side 39 thereof that is adjacent to side 17 of frame 36 in overhanging relationship to body portion 4 of support member 60 extending from side 17 of frame 36.

Previously described opening 34 in retainer clip 70 for use in prying retainer clip 70 away from engagement with support member 60 is preferably located at the intersection between lip 32 and base portion 12 as shown in FIG. 2B. Although an opening such as opening 34 is preferred, it is to be understood that any means such as a protuberance or the like may be included as part of clip 70 for prying members 60 and 70 apart from each other.

As shown in FIG. 2B and previously described, a region "R" of legs 16 and 18 (leg 18 not shown) of base portion 12 are preferably warped in a manner providing a tight fit of edges 20 and 22 in transverse groove 8 so as to urge face 5 of flange 2 against surface 13 of frame 36 to firmly secure support member 60 against axial movement within opening 19.

Although retainer clip 70 preferably has two spaced-apart resilient arms having free-ends operative to engage respective axially extending grooves in the outer surface of the body portion of support member 60, under certain circumstances one arm would suffice and therefore is considered within the scope of the invention.

Although retainer clip 70 may be made from any suitable material that provides the resiliency and strength required, it is preferably made from spring steel and preferably stamped rather than machined.

FIGS. 3 and 4 show a preferred use for the fastener assembly of the invention for supporting a headlight adjustment screw 48 in an opening through frame 36.

Frame 36 is provided with at least one rotation resistance means spaced-apart across the opening on the side thereof opposite from the entrance into the opening into which body portion 4 of support member 60 is received. The rotation resistance means spaced-apart on opposite sides of the opening is preferably in the form of substantially parallel elongate ribs 38 and 40 as shown in FIG. 3.

Base portion 12 of retainer clip 70 is adapted to fit between ribs 38 and 40 as base portion 12 is moved transversely downwardly adjacent the opposite side of frame 36 from the side having the opening into which body portion 4 of support member 60 is inserted. Opposite sides of retainer clip 70 provide respective contact portions that are operative to respectively engage ribs 38 and 40 and prevent it from rotating. Preferably, the sides are surfaces 42 and 44 respectively of resilient arms 24 and 26 of clip 70 which face away from each other respectively towards the particular rib adjacent thereto with the distance across retainer clip 70 between surfaces 42 and 44 being sufficiently greater than the distance between ribs 38 and 40 to create an interference fit. Since a portion of resilient arms 24 and 26 of retainer clip 70 preferably extend away from each other in a direction transverse to the axial direction of body portion 4 of support member 60, they provide a fit between ribs 38 and 40 sufficiently tight to enable ribs 38 and 40 to urge respective free-ends 28 and 30 of resilient arms 24 and 26 into engagement with respective axially extending grooves 10 in the outer surface of body portion 4.

As shown in FIGS. 3-5, support member 36 preferably includes a fulcrum such as protuberance 46 extending away from side 17 of frame 36. Fulcrum 46 is accessible for use in conjunction with a pry bar 56 or the like in combination with opening 34 to pry retainer clip 70 away from support member 60 as shown in FIG. 5.

FIG. 4 shows a cross-sectional view through the fastener assembly of FIG. 3 for supporting a headlight adjustment screw in a substantially cylindrical opening through frame 36. In practice, body portion 4 of support member 60 is preferably inserted into the frame opening from the opposite side of the frame until flange 2 abuts thereagainst and thence base portion 12 of retainer clip is slid downwardly between ribs 38 and 40 such that the opposed facing edges 20 and 22 of base portion slot 14 engage transverse groove 8 to secure support member 60 axially within the opening and the ribs urge resilient arm free-ends 28 and 30 into engagement with respective axially extending grooves 10 in the outer surface of body portion 4 as hereinbefore described.

In FIG. 4, bore 6 of support member 60 includes a threaded portion having threads which threadingly engage the threads of adjusting screw 48. Rotation of screw 48 in opposite directions causes screw 48 to move axially in opposite directions. Screw 48 has an end 50 operative to engage a fitting such as fitting 52 which is secured to movable frame 54 to which the headlight is secured and opposite axial movement of screw 48 through nut member 60 is operative to move frame 54 according to the position desired.

FIG. 6 shows an embodiment 80 of the retainer clip that includes flange portions 51 and 53 extending respectively outwardly from arms 24 and 26 preferably in a direction substantially parallel to base portion 12 that are adapted to provide openings 55 and 57 respectively therethrough that are adapted to receive reverse or spreading pliers or the like enabling arms 24 and 26 to be spread outwardly away from body portion 4 for a distance sufficient to enable removal of support member 60 from the frame opening.

What is claimed is:

1. A fastener assembly comprising a support member and a retainer clip for supporting an elongate member in a substantially cylindrical opening extending from one side to an oppposite side of a frame having means for resisting rotation of the retainer clip disposed on opposite sides of the frame opening;

said support member having a flange portion and an axially extending elongate body portion extending transversely therefrom with an open-ended bore extending through said flange and body portions, said body portion adapted to be received through the opening from said one side of the frame until the flange portion abuts thereagainst, and said body portion having a transverse groove in the outer surface thereof spaced axially from the flange member and a plurality of axially extending grooves positioned in the outer surface thereof such that when the flange member abuts against the one side of the frame the transverse groove is positioned adjacent to and the axially extending grooves are exposed on the opposite side of the frame, said retainer clip having a base portion having an open-ended slot therethrough between a pair of spaced-apart legs having opposed edges facing towards each other across the slot and operable to secure the support member axially within the frame opening by engaging the support member body portion transverse groove when the retainer clip base portion is moved between the rotation resistance means adjacent the opposite side of the frame transversely relative the support member body portion, resilient arms respectively extending from the base portion on opposite sides of the slot having respective free-ends adapted to engage respective axially extending grooves of the support member body portion when the support member is secured axially within the frame opening by the retainer clip, and said retainer clip having a pair of contact portions on opposite sides of the slot that respectively engage the frame rotation resistance means respectively adjacent thereto to prevent the retainer clip from rotating and which are operative to urge the respective resilient arm free-ends into engagement with said support member body portion axially extending grooves to prevent the support member from rotating relative the frame.

2. The fastener assembly of claim 1 wherein the support member body portion has a substantially cylindrical configuration and said axial grooves are spaced-apart circumferentially about the other surface thereof.

3. The fastener assembly of claim 1 wherein the rotation resistance means respectively comprise substantially parallel spaced-apart first and second rib members extending away from the frame on opposite sides of the opening therethrough and said retainer clip base portion is adapted to fit between said first and second rib members with opposite sides thereof engageable respectively therewith to prevent the retainer clip from rotating.

4. The fastener assembly of claim 1 wherein at least a portion of the spaced-apart legs of the retainer clip base portion are respectively warped in a manner operable to urge the flange portion against said one side of the frame to firmly secure the support member axially within the frame opening.

5. The fastener assembly of claim 1 wherein the retainer clip includes removal means that enables the retainer clip to be pried away from engagement with the support member to enable release thereof from the frame.

6. The fastener assembly of claim 5 wherein the removal means is an opening in the retainer clip base portion adapted to receive a pry bar therein for prying the retainer clip away from engagement with the support member.

7. The fastener assembly of claim 1 wherein the retainer clip includes a lip that extends substantially transversely from a side of the base portion thereof opposite from the side thereof having the slot opening such that, when the support member is secured by the retainer clip to the frame, the lip extends in overhanging relationship to the support member body portion.

8. The fastener assembly of claim 7 wherein the retainer clip includes an opening at the intersection between the lip and the base portion thereof that is accessible to receive a pry bar thereinto enabling the retainer clip to be pried away from engagement with the support member.

9. The fastener assembly of claims 5, 6 or 8 wherein the frame includes a projection extending away from the opposite side thereof that is adapted to provide a fulcrum for prying the retainer clip away from engagement with the support member.

10. The fastener assembly of claim 1 wherein the elongate member is an elongate rotary member provided with external threads and the support member is a nut member with at least a portion of the length of the nut member wall extending through the flange and body portions having threads adapted to threadingly engage the threads of the elongate member.

11. The fastener assembly of claim 10 wherein the elongate threaded member is a position adjustment screw for a vehicular headlight operable to move a movable frame upon which the headlight is mounted according to the direction in which the screw is rotated relative the nut member.

12. The fastener assembly of claim 1 wherein the contact portions comprise respective surfaces on said resilient arms facing away from the support member.

13. A fastener assembly of claim 1 wherein the resilient arms include a flange portion providing an opening respectively therethrough operative to enable said arms to be spread away from each other for a distance sufficient to disengage the arms from the body portion.

14. A fastener assembly for supporting an externally threaded vehicular headlight position adjustment screw in a substantially cylindrical opening extending from one side to an opposite side of a frame having a pair of substantailly parallel rib members disposed in spaced-apart relationship to each other on opposite sides of the frame opening, said assembly comprising;

a nut member having a flange portion and an axially extending elongate body portion extending transversely therefrom with an open-ended bore extending through said flange and body portions having threads along at least a portion of the length thereof adapted to threadingly engage the threads of the adjustment screw, said body portion adapted to be received through the opening from said one side of the frame until the flange portion abuts thereagainst, said body portion having a transverse groove in the outer surface thereof spaced axially from the flange member and a plurality of axially extending grooves positioned in the outer surface thereof such that when the flange member abuts against the one side of the frame the transverse groove is positioned adjacent to and the axially extending grooves are exposed on the opposite side of the frame, a retainer clip, said clip having a base portion having an open-ended lot therethrough between a pair of spaced-apart legs having opposed edges facing towards each other across the slot and operable to secure the nut member axially within the frame opening by engaging the nut member body portion transverse groove when the retainer clip base portion is moved between the rib members adjacent the opposite side of the frame transversely relative the nut member body portion, said retainer clip having a pair of spaced-apart resilient arms respectively extending away from the base portion on opposite sides of the slot, said arms having respective free-ends adapted to engage respective axially extending grooves of the nut member body portion when the nut member is secured axially within the frame opening by the retainer clip, and said arms having respective surfaces that face away from each other and engage the rib members respectively adjacent thereto to prevent the retainer clip from rotating and which are operative to urge the respective resilient arm free-ends into engagement with said nut member axially extending grooves when the base portion is moved between the ribs adjacent the opposite side of the frame transversely relative the nut member body portion to prevent the nut member from rotating when the adjustment screw is rotated relative the nut member.

* * * * *